US 8,902,617 B2

(12) United States Patent
Wahledow et al.

(10) Patent No.: US 8,902,617 B2
(45) Date of Patent: Dec. 2, 2014

(54) SWITCHING DELAY CONTROLLER FOR A SWITCHED MODE POWER SUPPLY

(75) Inventors: Fredrik Wahledow, Farjestaden (SE); Henrik Borgengren, Kalmar (SE); Magnus Karlsson, Oskarshamn (SE); Anders Kullman, Kalmar (SE); Jonas Malmberg, Farjestaden (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 268 days.

(21) Appl. No.: 13/502,276

(22) PCT Filed: May 10, 2011

(86) PCT No.: PCT/EP2011/057490
§ 371 (c)(1),
(2), (4) Date: Apr. 16, 2012

(87) PCT Pub. No.: WO2012/152314
PCT Pub. Date: Nov. 15, 2012

(65) Prior Publication Data
US 2012/0287681 A1    Nov. 15, 2012

(51) Int. Cl.
*H02M 1/38*    (2007.01)
*H02M 3/335*    (2006.01)

(52) U.S. Cl.
CPC ............ *H02M 1/38* (2013.01); *H02M 3/33592* (2013.01); *Y02B 70/1475* (2013.01)
USPC ...................................................... 363/56.04

(58) Field of Classification Search
CPC .............. H02M 1/38; H02M 2001/38; H02M 2001/285
USPC ........................................ 363/56.04, 16, 115
See application file for complete search history.

(56) References Cited

U.S. PATENT DOCUMENTS

| | | |
|---|---|---|
| 7,098,640 B2 | 8/2006 | Brown |
| 7,206,208 B1 | 4/2007 | Hsu et al. |
| 2005/0281058 A1 | 12/2005 | Batarseh et al. |
| 2006/0083037 A1 | 4/2006 | Leung et al. |
| 2006/0152204 A1 | 7/2006 | Maksimovic et al. |
| 2010/0156376 A1 | 6/2010 | Fu et al. |

OTHER PUBLICATIONS

Notification Concerning Transmittal of International Preliminary Report on Patentability in corresponding PCT Application No. PCT/EP2011/057490 mailed Jun. 12, 2013 (19 pages).
International Search Report Corresponding to International Application No. PCT/EP2011/057490; Date of Mailing: May 11, 2012; 12 Pages.

*Primary Examiner* — Harry Behm
*Assistant Examiner* — Matthew Grubb
(74) *Attorney, Agent, or Firm* — Myers Bigel Sibley & Sajovec, PA (57) ABSTRACT

A switching delay controller is configured to control a switching delay between the switching of first and second switching elements in a switched mode power supply. The switched mode power supply generates a feedback signal indicative of a difference between an output of the switched mode power supply and a reference for the output, and switches the first and second switching elements to convert an input voltage into an output voltage based on the feedback signal. The switching delay controller includes a switching delay calculator operable to cause a change of the switching delay for at least one switching cycle of the switched mode power supply, and a feedback signal monitor operable to monitor the feedback signal and determine a change in the feedback signal in response to the change of the switching delay by the switching delay calculator.

17 Claims, 7 Drawing Sheets

SWITCHING DELAY CONTROLLER FOR A SWITCHED MODE POWER SUPPLY

CROSS REFERENCE TO RELATED APPLICATION

This application is a 35 U.S.C. §371 national stage application of PCT International Application No. PCT/EP2011/057490, filed on 10 May 2011, the disclosure and content of which is incorporated by reference herein in its entirety.

TECHNICAL FIELD

The present invention generally relates to the field of switched mode power supplies (sometimes referred to as switch mode power supplies or switching mode power supplies) and more specifically to the control of a delay between the switching of switching elements in a switched mode power supply.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more a switching elements such as power MOSFETs at a high frequency (usually tens to hundreds of kHz), with the frequency or duty cycle of the switching being adjusted using a feedback signal to convert an input voltage to a desired output voltage. A SMPS may take the form of a rectifier (AC/DC converter), a DC/DC converter, a frequency changer (AC/AC) or an inverter (DC/AC). Commonly, to minimise power loss in a power distribution system, the power is distributed at high voltage levels and then transformed to the required level near the load using a rectifier or DC/DC converter.

Figure 1:
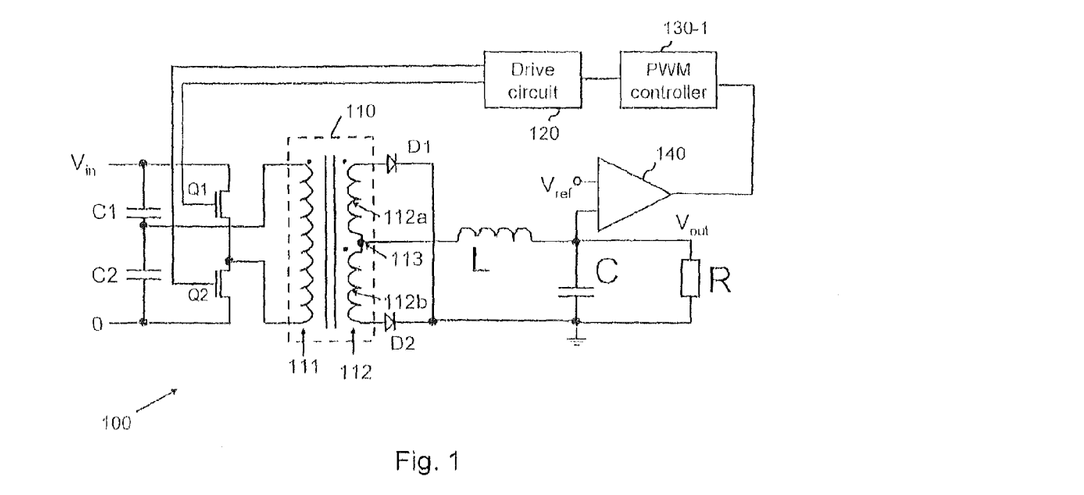
FIG. 1 shows a background example SMPS circuit having a centre-tapped secondary side transformer winding and diode rectification.

FIG. 1 shows a background example of an isolated SMPS, i.e. a SMPS which converts an input voltage $V_{in}$ to an output voltage $V_{out}$ whilst isolating the input from the output through a transformer. The SMPS 100 is provided in the form of a DC-to-DC converter which has on its primary side a primary side circuit with a half-bridge arrangement comprising two transistors, Q1 and Q2 (which may, for example, be field-effect transistors such as MOSFETs or IGBTs) and two capacitors, C1 and C2, which are connected between the power supply's inputs and to the primary winding 111 of the isolation transformer 110, as shown. The transistors Q1 and Q2 are thus configured to drive the primary winding 111. The use of only two transistors to handle currents on the primary side makes the half-bridge configuration best suited to low-power applications requiring a low parts count.

Although a half-bridge configuration is employed in the present example, other well-known topologies may alternatively be used on the primary side. For example, a full-bridge configuration with four transistors may be more suitable for higher-power applications. Alternatively, a push-pull arrangement can be used. In all these configurations, the switching of the transistors is controlled by a controller circuit comprising a drive circuit 120, a pulse width modulation (PWM) controller 130-1, and a feedback signal generator 140. The drive circuit 120 comprises a pulse width modulator which generates respective drive pulses to be applied to the gates of transistors Q1 and Q2 in order to turn the transistors ON or OFF, the drive pulses being generated in accordance with control signals provided to the drive circuit 120 by the PWM controller 130-1. In turn, the PWM controller 130-1 is arranged to receive a feedback signal generated by a feedback signal generator, which in this example is provided in the form of an error amplifier 140. The feedback signal generated by the error amplifier 140 provides a measure of the difference between the output of the SMPS 200 (here, the output voltage) and a reference for the output, which is a reference voltage $V_{ref}$ in the present example.

FIG. 1 also shows a standard topology on the secondary side of the isolated SMPS 100, which includes a rectifying circuit and an LC filter connected to a load R. The inductor L of the LC filter is connected to the secondary winding 112 of the transformer 110. A centre-tap 113 referenced to ground is provided between a first portion 112a of the secondary winding 112 having $n_2$ turns and a second portion 112b of the winding 112 also having $n_2$ turns. In the present example, the rectifying network in the secondary side circuit employs two diodes, D1 and D2, to yield full-wave rectification of the voltage induced in the secondary winding 112.

Power efficiency is, of course, a key consideration in the design of switched mode power supplies and its measure generally dictates the quality of the SMPS. Increasing the efficiency allows the packing density of the power supply components to be increased, leading to lighter, more compact power supplies that operate at lower temperatures and with higher reliability, especially at higher load levels. A higher efficiency also makes the power supply more environmentally friendly and economical to operate. Much research effort has therefore been directed at improving power efficiency.

For example, efforts have been directed to minimise switching and conduction losses in the transistors through the optimization of their structure, and to developing improved control architecture options (e.g. pulse skipping), as well as to reducing trace losses and other parasitics by appropriately integrating the switching devices into an IC package. Steps have also been taken to minimise losses in the passive components of the SMPS. Notably, resistive losses in the inductor windings, losses due to hysteresis and eddy currents in the transformer core, and losses in the capacitors due to their series resistance and leakage, and their dielectric losses, have all been addressed by efforts to improve the design of these components.

Figure 2:
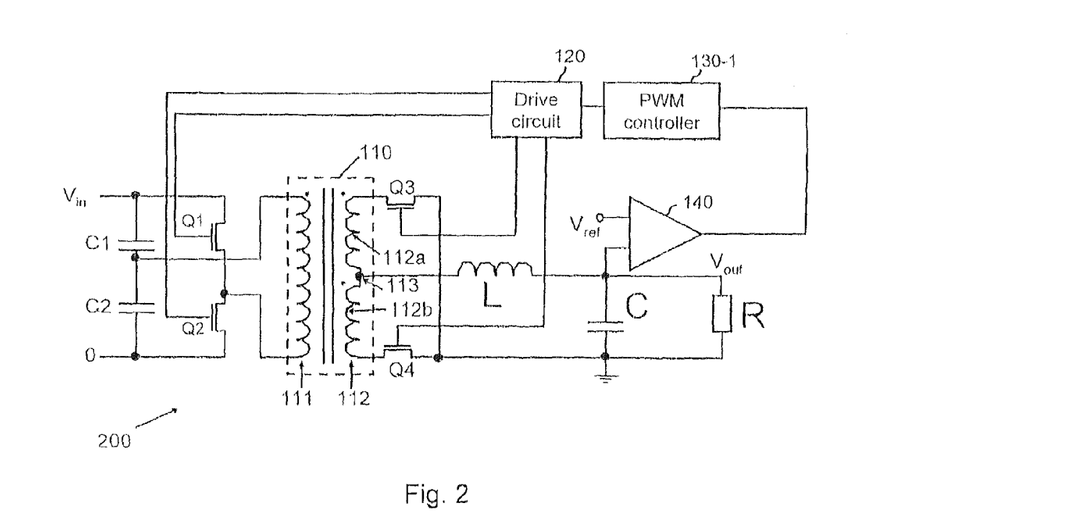
FIG. 2 illustrates a variant of the SMPS circuit shown in FIG. 1 which employs synchronous rectification.

In addition, Schottky diodes have extremely small reverse-recovery times and are therefore often used in order to minimize power losses associated with the diode switching. Alternatively, in order to improve the efficiency of a converter as shown in FIG. 1 at higher current levels, the diodes D1 and D2 in the secondary side circuit in FIG. 1 can be replaced with a synchronous rectifier circuit comprising transistors, as shown at Q3 and Q4 in the SMPS circuit 200 of FIG. 2. Each of the switching devices Q3 and Q4 can take any suitable or desirable form, and are preferably field-effect transistors in the form of an N-MOSFET or a P-MOSFET, or an IGBT, for example. In the example of FIG. 2, the switch devices Q3 and Q4 have an internal body drain diode, which is not shown in the switch device symbol in FIG. 2. The switching of these transistors is controlled by the same controller circuit that controls the switching of transistors Q1 and Q2, namely that comprising the drive circuit 120, the PWM controller 130-1 and the error amplifier 140. The control circuit drives transistors Q1 to Q4 such that the primary side transistors Q1 and Q2 are synchronized with the secondary side transistors Q3 and Q4 in a way that achieves the highest possible efficiency, as explained in the following.

The principles of operation of the SMPS shown in FIG. 2 will be familiar to those skilled in the art, such that a detailed explanation thereof is unnecessary here. Nevertheless, some of the basics will now be reviewed, to assist understanding of the present invention.

Figure 3:
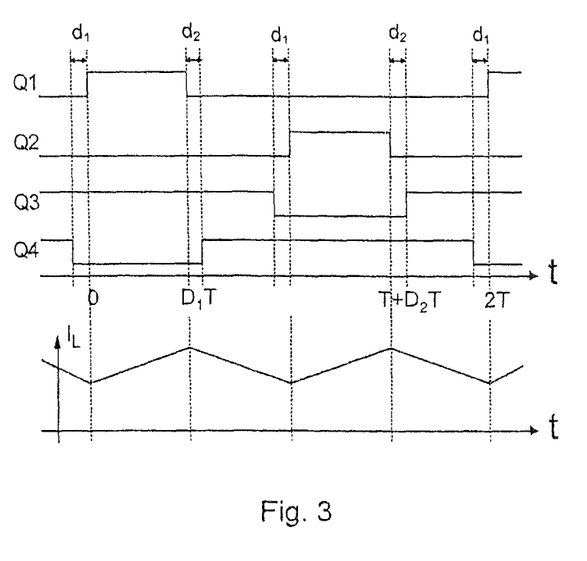
FIG. 3 shows a timing diagram in accordance with which the circuit of FIG. 2 operates in continuous conduction mode to yield a current in the output choke that is always positive.

FIG. 3 shows the switching cycle diagram in accordance with which the gate electrodes of switches Q1-Q4 in FIG. 2 are driven by the SMPS controller circuit so that the primary side circuit generates a series of voltage pulses to be applied to the primary winding 111 of the transformer 110. The switching illustrated in FIG. 3 causes the SMPS circuit 200 of FIG. 2 to operate in the so-called "continuous conduction mode", where the DC current drawn by the load R at the output of the power supply is large enough for the current $I_L$ flowing through the inductor L to remain above zero throughout the switching cycle. In FIG. 3, "$D_1$" and "$D_2$" represent the switching duty cycles of transistors Q1 and Q2, respectively, and "T" represents the switch period. The operation of the circuit during the four time periods 0 to $D_1T$, $D_1T$ to T, T to $(T+D_2T)$ and $(T+D_2T)$ to 2T is as follows. Time period 1 ($0<t<D_1T$): Switching device Q1 is switched ON while Q2 is OFF, allowing the input source at $V_{in}$ to charge capacitors C1 and C2 via the primary winding 111 of the transformer 110. During this period, switching device Q3 is switched ON while device Q4 is switched OFF, allowing the source to transfer energy to the load R via the secondary winding 112 of the transformer 110. The output voltage $V_{out}=n_2/n_1 \cdot V_{in}$, where $n_1$ is the number of turns in the primary winding.

Time period 2 ($D_1T<t<T$): Switch Q3 remains ON while switch Q4 is turned ON following a delay of $d_2$ after a signal is applied to the gate of Q1 to switch it OFF. The delay $d_2$ should be set such that Q1 reaches its non-conductive state before Q4 begins to switch ON, thereby ensuring that Q4 does not short-circuit the secondary winding 112 while energy is still being transferred from the primary side circuit to the secondary side circuit. With both Q3 and Q4 switched ON, the current in the secondary side circuit free-wheels through both portions of the secondary side winding in substantially equal measure, allowing the transformer flux to be balanced. In other words, the free-wheeling current generates two magnetic fluxes within the secondary winding with opposite directions in the vicinity of the centre-tap 113, yielding a net magnetic flux equal to zero in an area between the first and second portions of the secondary winding 112. Hence, the transformer core magnetization is balanced to zero, and the current in the primary winding during the free-wheeling period $D_1T-T/2$ is suppressed, thereby avoiding losses in the primary winding.

Time period 3 ($T<t<T+D_2T$): In this interval, switching device Q1 remains switched OFF while device Q2 is turned ON at time t=T, allowing the capacitors C1 and C2 to discharge through the primary winding 111, exciting it with a voltage of opposite polarity to that in the first time period described above. On the secondary side, switch Q4 remains ON while switch Q3 is OFF, allowing the EMF generated in the lower portion of the secondary winding to drive a current through the inductor L. As shown in FIG. 3, there is a delay of $d_1$ between a signal being applied to the gate of switch Q3 to switch it OFF, and Q2 subsequently being switched ON. This delay is set so that Q3 reaches its non-conductive state before Q2 begins to conduct thereby ensuring that Q3 does not short-circuit the secondary winding 112 when energy starts to be transferred from the primary side circuit to the secondary side circuit in time period 3.

Time period 4 ($T+D_2T<t<2T$): In this interval, Q1 remains OFF and Q2 is turned OFF at $t=T+D_2T$. Then, after a delay of $d_2$, Q3 is turned ON. With both of Q3 and Q4 being switched ON, the current in the secondary side circuit free-wheels through both portions of the secondary side winding in substantially equal measure, allowing the transformer flux to be balanced, as in time period 2. The delay $d_2$ should be set such that Q2 reaches its non-conductive state before Q3 begins to switch ON thereby ensuring that Q3 does not short-circuit the secondary winding 112 while energy is still being transferred from the primary side circuit to the secondary side circuit. Later in time period 4, a delay of $d_1$ is introduced between a signal being applied to the gate of Q4 to switch it OFF, and Q1 being switched ON. This delay is set so that Q4 reaches its non-conductive state before Q1 begins to conduct thereby ensuring that Q4 does not short-circuit the secondary winding 112 when energy starts to be transferred from the primary side circuit to the secondary side circuit.

The delays (also widely known and referred to herein as "dead times") $d_1$ and $d_2$ should be adjusted to avoid unnecessary losses, as explained above. Conventionally, these dead times had to be fixed, which meant that certain safety margins had to be used in order to provide for varying power supply load levels, component ageing, temperature variations etc. This conventional approach inevitably causes the power supply to operate with sub-optimal efficiency under most circumstances.

More recently, efforts have been made to improve power supply efficiency by adjusting the dead times dynamically. Some approaches employ pre-determined look-up tables, which need to be set up by studying the behaviour of the power supply under certain known (control) conditions. However, the dead times determined in this way will generally not be ideal for use in other circumstances, for example under different load conditions or where the component value spread in a power supply is greater than expected. In other approaches, the dead times are adjusted during operation using data sampled from various sources, e.g. output current, temperature, input and output voltage. One problem with such approaches is that they increase the complexity and cost of the power supply since additional means for sampling data (e.g. the input current) with a high level of accuracy may be required. Furthermore, such approaches often cannot be implemented efficiently as they place high demands on data processing power and take a long time to optimize the dead time (hundreds of switch cycles in some cases).

Yet despite all these efforts, there still remains a need to further improve the efficiency of the SMPS.

SUMMARY

The present invention addresses the shortcomings of the known approaches to improving the efficiency of a SMPS outlined above and allows the switching delay in a SMPS to be tuned quickly (often within a few switching cycles) and in a computationally efficient way whilst exploiting the existing hardware components of the power supply's feedback loop and thus keeping down the parts count, complexity and manufacturing cost of the SMPS. In addition, the controller according to embodiments of the invention described herein allows the dead time to the optimised dynamically without jeopardising the function of the SMPS and without (in practice) affecting the quality of the power supply's output.

More specifically, the present invention provides in a first aspect a switching delay controller for controlling a switching delay between the switching of a first and a second switching element in a switched mode power supply, the switched mode power supply comprising a feedback signal generator operable to generate a feedback signal indicative of a difference between an output of the switched mode power supply and a reference for the output, and a drive circuit for switching the first and second switching elements so as to convert an input voltage to the switched mode power supply into an output voltage thereof based on the feedback signal. The switching delay controller comprises a switching delay calculator operable to cause a change of the switching delay for at least one switching cycle of the switched mode power supply, and a feedback signal monitor operable to monitor the feedback signal and determine a change in the feedback signal in response to the change to the switching delay by the switching delay calculator. The switching delay calculator is further operable to calculate a switching delay to increase an efficiency of the switched mode power supply based on the determined change in the feedback signal, and cause a change of the switching delay in the switched mode power supply to the calculated switching delay.

Thus, the switching delay controller is configured to determine from its monitoring of the feedback signal from the SMPS's existing feedback signal generator (which may be provided in the simple form of an error amplifier) the response of the SMPS to a change in the switching delay that occurs between the switching of the first and second switching elements, which are employed in the SMPS's power train to convert the input voltage to the output voltage. The switching delay controller is further configured to calculate on the basis of the determined response a switching delay that will improve the efficiency of the SMPS, and cause the switching delay to be changed by the drive circuit of the SMPS to the calculated switching delay, thereby improving the efficiency with which the SMPS operates under the current load level, temperature and other prevailing conditions.

The present invention provides in a second aspect a switched mode power supply comprising: a feedback signal generator operable to generate a feedback signal indicative of a difference between an output of the switched mode power supply and a reference for the output; a first switching element and a second switching element; and a drive circuit arranged to switch the first and second switching elements so as to convert an input voltage to the switched mode power supply into an output voltage thereof based on the feedback signal. The switched mode power supply also includes a switching delay controller according to the first aspect of the invention as set out above, which is arranged to control a switching delay between the switching of the first and second switching elements.

The present invention provides in a third aspect a method of controlling a switching delay between the switching of a first and a second switching element in a switched mode power supply, the switched mode power supply comprising a feedback signal generator generating a feedback signal indicative of a difference between an output of the switched mode power supply and a reference for the output, and a drive circuit switching the first and second switching elements so as to convert an input voltage to the switched mode power supply into an output voltage thereof based on the feedback signal. The method comprises: causing a change of the switching delay for at least one switching cycle of the switched mode power supply; monitoring the feedback signal and determining a change in the feedback signal in response to the change to the switching delay; calculating a switching delay to increase an efficiency of the switched mode power supply based on the determined change in the feedback signal; and causing a change of the switching delay in the switched mode power supply to the calculated switching delay.

The present invention further provides a computer program product, comprising a computer-readable storage medium or a signal, carrying computer program instructions which, when executed by a processor, cause the processor to perform a method as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Embodiment 1

Figure 4:
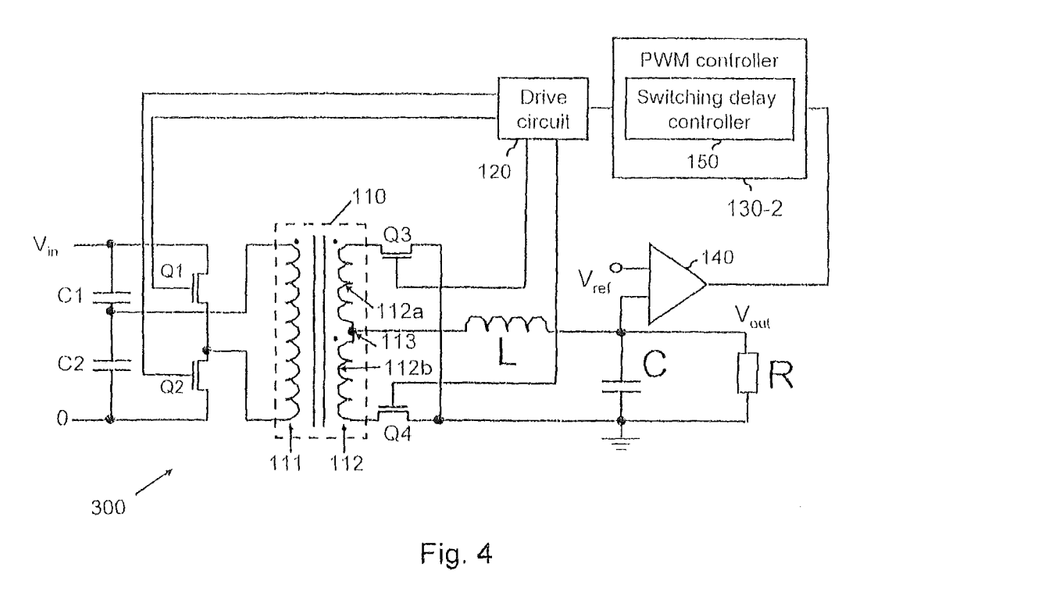
FIG. 4 shows a SMPS circuit according to a first embodiment of the invention, having a PWM controller that includes a switching delay controller.

FIG. 4 shows a SMPS 300 according to a first embodiment of the present invention, which differs from the background example of FIG. 2 by the PWM controller 130-2 being provided with a switching delay controller 150 for controlling a time delay between the switching of certain pairs of transistors among Q1-Q4 in the manner described below so as to increase the efficiency of the SMPS. The SMPS is otherwise the same as that described above with reference to FIGS. 2 and 3 and the conventional aspects of its operation will therefore not be repeated here.

Figure 5:
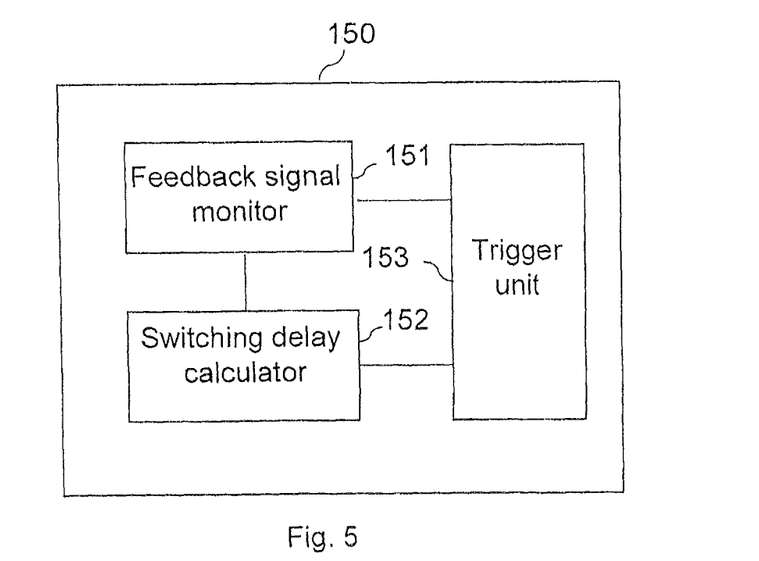
FIG. 5 shows details of the switching delay controller according to the embodiments described herein.

FIG. 5 shows the components of the switching delay controller 150 of the present embodiment. The switching delay controller 150 comprises a feedback signal monitor 151, a switching delay calculator 152 and a trigger unit 153, which are arranged to communicate with one another. Although the switching delay controller 150 is comprised in the PWM controller 130-2 in the present embodiment, it may alternatively be provided as a stand-alone device which is arranged to receive the feedback signal from the error amplifier 140 and cause the switching delay to be adjusted, for example, by issuing appropriate control signals to the drive circuit 120 directly, or by instructing the PWM controller 130-2 to control the drive circuit 120 so that it drives the transistors according to the required timings.

Figure 6:
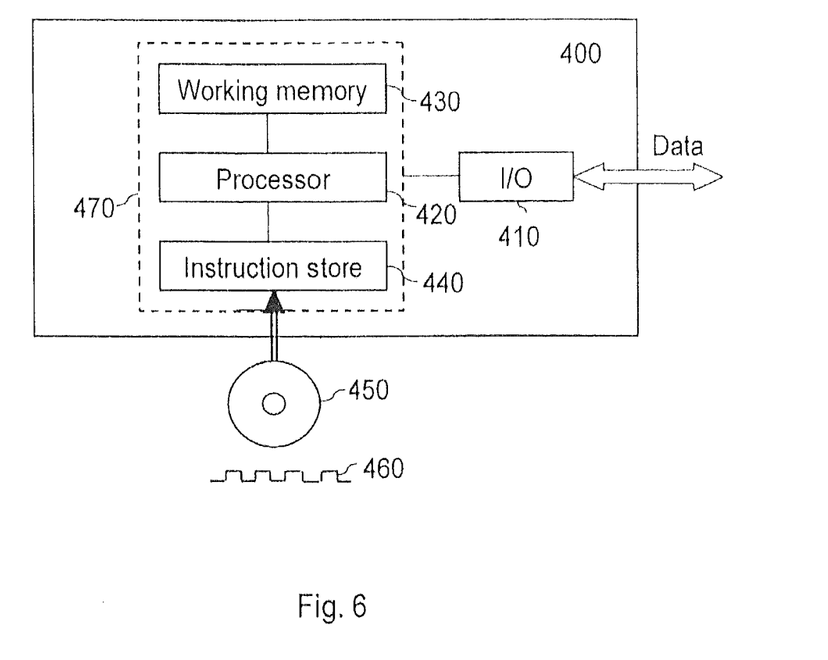
FIG. 6 illustrates a programmable data processing apparatus used to implement the PWM controller, including the switching delay controller, of the embodiments described herein.

An example of a general kind of programmable signal processing apparatus in which the switching delay controller 150 may be implemented is shown in FIG. 6. The signal processing apparatus 400 shown comprises an input/output section 410, a processor 420, a working memory 430, and an instruction store 440 storing computer-readable instructions which, when executed by the processor 420 cause the processor 420 to function as a switching delay controller in performing the processing operations hereinafter described to cause a change of the switching delay in the SMPS to a calculated value at which the SMPS operates more efficiently.

The instruction store 440 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 440 may comprise a volatile memory (e.g. DRAM or SRAM), and the computer-readable instructions can be input thereto from a computer program product, such as a computer-readable storage medium 450 (e.g. an optical disc such as a CD-ROM, DVD-ROM etc.) or a computer-readable signal 460 carrying the computer-readable instructions.

The working memory 430 functions to temporarily store data to support the processing operations executed in accordance with the processing logic stored in the instruction store 440. As shown in FIG. 6, the I/O section 410 is arranged to communicate with the processor 420 so as to render the signal processing apparatus 400 capable of processing received signals and communicating its processing results.

The combination 470 of the processor 420, working memory 430 and the instruction store 440 (when appropriately programmed by techniques familiar to those skilled in the art) together constitute the feedback signal monitor 151, the switching delay calculator 152 and the trigger unit 153 of the switching delay controller 150 of the present embodiment. The combination 470 also provides the function of the PWM controller 130-2 in the present embodiment, although the functions of the PWM controller and the switching delay controller may alternatively be provided by separate hardware of the kind shown in FIG. 6. Furthermore, the functions of the PWM controller 130-2 and the drive circuit 120 may be provided by a single integrated circuit.

The operations performed by the switching delay controller 150 of the present embodiment to control the switching delay (also referred to herein as the switching dead time) in the SMPS 300 will now be described with reference to FIG. 7.

Figure 7:
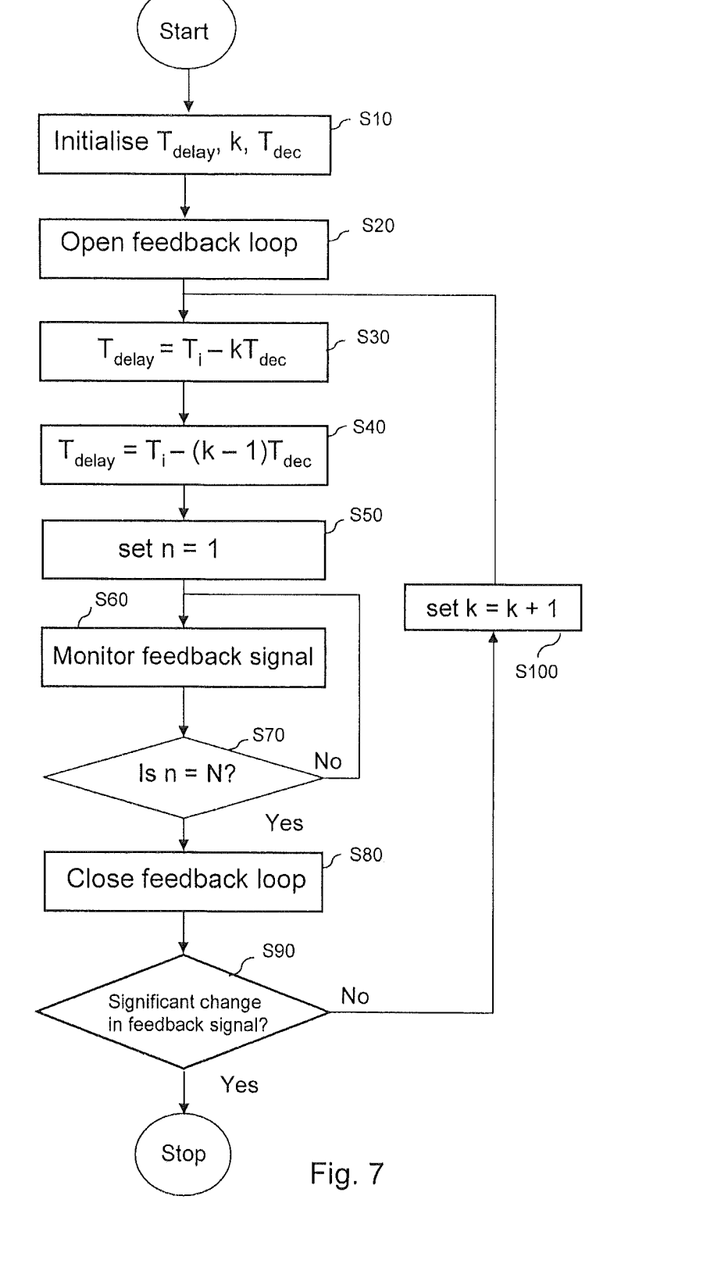
FIG. 7 is a flow diagram illustrating the operations performed by the switching delay controller in the first embodiment.

FIG. 7 is a flow chart which illustrates the process steps by which the switching delay controller 150 controls one or both of the delays $d_1$ and $d_2$ shown in FIG. 3 so as to increase the efficiency with which the SMPS operates towards a maximum value for the prevailing conditions (load level, input voltage, temperature etc.).

The process starts with step S10, in which the counter k is set to an initial value of 1 and the delay time being optimised, $T_{delay}$ (which corresponds to either $d_1$ or $d_2$), is set to a safe initial value, $T_i$, which ensures that transistor Q3 (or, as the case may be, Q4) does not short-circuit the secondary winding 112 while energy is being transferred from the primary side circuit to the secondary side circuit during operation of the SMPS 300 and thus risk damaging the power supply. The initial delay value $T_i$ depends on the current operation state of the SMPS 300 and will generally be a function of the power supply's input voltage $V_{in}$ and its output current $I_{out}$. The quantisation step $T_{dec}$ for the changes in the switching delay time $T_{delay}$ is also set to a value that is appropriate for the current operation state. The operation state of the power supply also plays a role in the triggering of the delay optimisation algorithm by the trigger unit 153 and is discussed further below.

Following the initialisation in step S10, the process proceeds to step S20, where the feedback loop between the error amplifier 140 and the drive circuit 120 is temporarily opened, for example by the switching delay controller 150 ceasing to relay any changes in the feedback signal which it receives from the error amplifier 140 to the PWM controller 130-2. The PWM controller 130-2 therefore starts to transmit a control signal to the drive circuit 120 that causes the drive circuit to drive the transistors with constant switching delays therebetween.

In step S30, the switching delay calculator 152 causes a change of the switching delay $T_{delay}$ from $T_i$ to $T_i - kT_{dec}$ for one switching cycle of the SMPS, by providing the corresponding instruction to the drive circuit 120 directly or via the PWM controller 130-2. Then, in step S40, the switching delay is set back to the previous value, i.e. $T_i - (k-1)T_{dec}$. In this way, the switching delay calculator 152 causes the switching delay to change by the incremental value $T_{dec}$ for the duration of a single switching cycle of the SMPS, thereby minimising the risk of the SMPS sustaining damage in case the temporarily decreased value of $T_{delay}$ leads to a short-circuit of the secondary winding 112 of the power supply's transformer. For this reason, it is preferable that the switching delay calculator 152 causes a change of the switching delay $T_{delay}$ by the drive circuit 120 for only one switching cycle (or only a small number of switching cycles, e.g. two to 10 switching cycles). On the other hand, changing the switching delay for more than one switching cycle may in some cases increase accuracy by making the resultant change in the feedback signal easier to detect using the available error amplifier 140. In general, the optimal number of switching cycles over which the delay $T_{delay}$ is changed will depend on the size of the components (and the parasitics, like capacitance and inductance in the switching devices and the transformer) and how sensitive these are to temporary short-circuits.

In step S50, a second counter n is initialised to the value of 1 and then the feedback signal monitor 151 of the switching delay controller 150 monitors the feedback signal from the error amplifier 140 in step S60 in order to determine a change in the feedback signal which may have arisen as a result of the switching delay having been changed temporarily earlier in step S30. In step S70, the feedback signal monitor 151 checks whether the target count of n=N has been reached and, if not, the process loops backs to step S60 during the course of a switch cycle so that the feedback signal monitor 151 samples the feedback signal in each switch cycle. The value of N (and thus the duration of the feedback signal monitoring process) depends on the analog bandwidth of the power supply 300 and must be determined for each application. The time interval TN (where T is the switching period) should be longer than the time it takes for the voltage drop across the secondary side switches Q3 and Q4 to propagate through the output filter of the power supply and into the error amplifier 140. The value of N can readily be adjusted by trial and error to suit a particular SMPS. It is noted that the changes may be made to the switching delay by the switching delay calculator 152 either before the feedback signal monitoring process begins, as in the present embodiment, or alternatively before the monitoring process has been completed.

Once the counter n has reached the target count N, the feedback signal monitoring process stops and the feedback loop is then closed in step S80 so that the PWM controller 130-2 resumes its function of regulating the output voltage of the SMPS 300 using the feedback signal from the error amplifier 140.

In step S90, the switching delay calculator 152 determines whether there has been a significant change in the feedback signal whilst it was being monitored by the feedback signal monitor 151, the significance of the change being determined for the application at hand. The significance of the change may be determined by comparing the mean or extreme value of the monitored feedback signal against a threshold value, for example.

A significant change determined in step S90 is taken to provide an indication that the temporary decrease of the switching delay $T_{delay}$ by the switching delay calculator 152 in step S30 has caused a temporary shorting of the secondary winding 112 of the transformer 110. In this case, the switching delay calculator 152 establishes that no further efficiency gain can be achieved by decrementing the value of $T_{delay}$, and it therefore stops the switching delay optimisation process.

On the other hand, if the switching delay calculator 152 determines in step S90 that there has been no significant change in the feedback signal during the monitoring process (steps S60 and S70), then it can be assumed that the temporary decrease of the switching delay effected by steps S30 and S40 can be made permanent without adverse effect on the SMPS. The counter k is then incremented by 1 in step S100 before the process loops back to step S30. The switching delay is subsequently decremented by $2T_{dec}$ to $T_i - 2T_{dec}$ step before being in S30 before being set to $T_i - T_{dec}$ (a safe value which was determined in the previously executed feedback signal monitoring process to not cause a shorting of the secondary winding 112).

Figure 8:
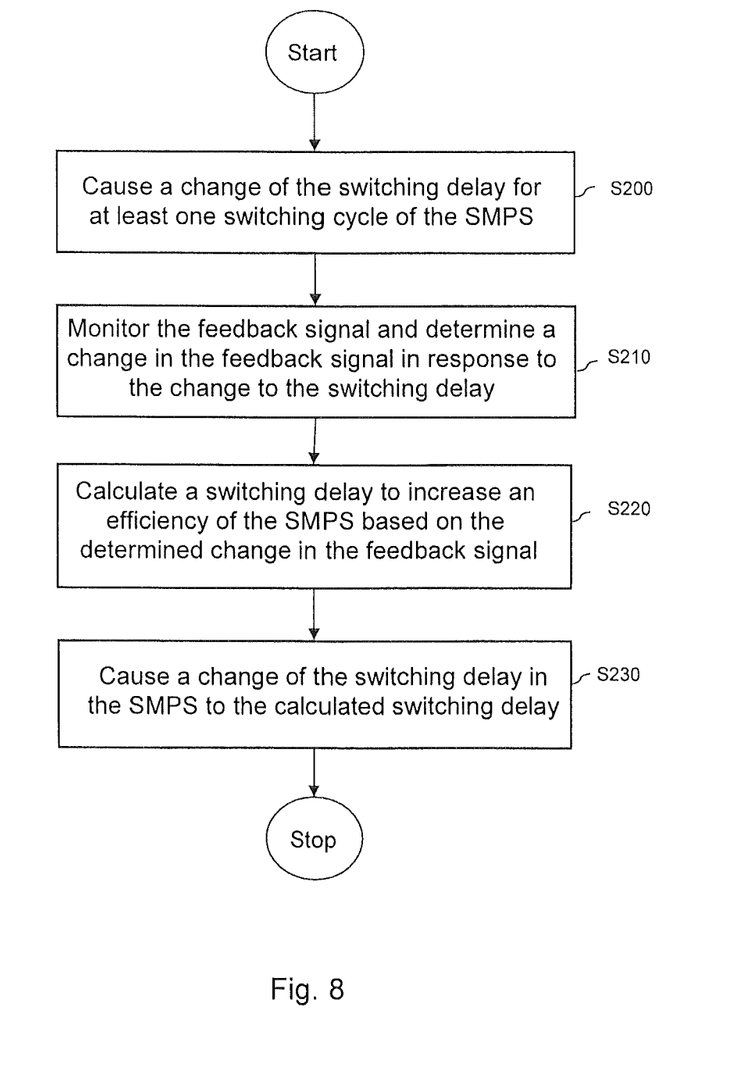
FIG. 8 is a flow diagram summarising the operation of the switching delay controller in the first embodiment.

In summary, as illustrated in FIG. 8, the switching delay controller 150 operates to cause a change of the switching delay for at least one switching cycle of the switched mode power supply in step S200. In step S210, it monitors the feedback signal and determines a change in the feedback signal in response to the change to the switching delay. In step S220, it calculates a switching delay to increase an efficiency of the switched mode power supply based on the determined change in the feedback signal and, in step S230, causes a change of the switching delay in the switched mode power supply to the calculated switching delay.

The above-described processes of temporarily reducing the switching delay, monitoring the feedback signal and evaluating the change in the feedback signal in response to the change in the switching delay can be repeated iteratively until the most efficient value for the switching delay is reached whilst ensuring that the switching delay calculated by the switching delay calculator 152 is such that neither of the transistors Q3 and Q4 on the secondary side short-circuits the secondary winding while energy is being transferred from the primary side circuit to the secondary side circuit. The switching delay can thus be optimised in a fast, computationally efficient way.

The above-described process can be executed by the switching delay controller 150 to adjust the dead time towards a value that maximises the efficiency of the power supply for the prevailing operating conditions. However, the optimum dead time will depend on the state of operation of the SMPS 300, which can be defined in terms of the input voltage $V_{in}$ and output current $I_{out}$ of the SMPS since the turn ON/OFF times of the transistors are dependent mainly on these variables. Thus, as shown in FIG. 5, the switching delay controller 150 preferably includes a trigger unit 153 which is operable to detect a change in at least one of the input voltage $V_{in}$ and an output current $I_{out}$ of the switched mode power supply, and upon detecting said change and determining that the change is sufficiently large to warrant running the optimisation algorithm, issue a control signal to cause the switching delay calculator 152 to control the switching delay in the manner described above.

Moreover, in the present embodiment, the operation state of the SMPS can be regarded as falling within one of a number of operation regions, each defined by a respective range of values for at least one of the input voltage $V_{in}$ and output current $I_{out}$ of the SMPS. In the present example, the following operation regions for the load current can be identified:
i) Idling current, $I_{out} \approx 0$ A;
ii) Continuous conduction mode, where the current $I_L$ reverses in the inductor; and
iii) Continuous conduction mode, where the current $I_L$ in the output choke remains positive.

Figure 9:
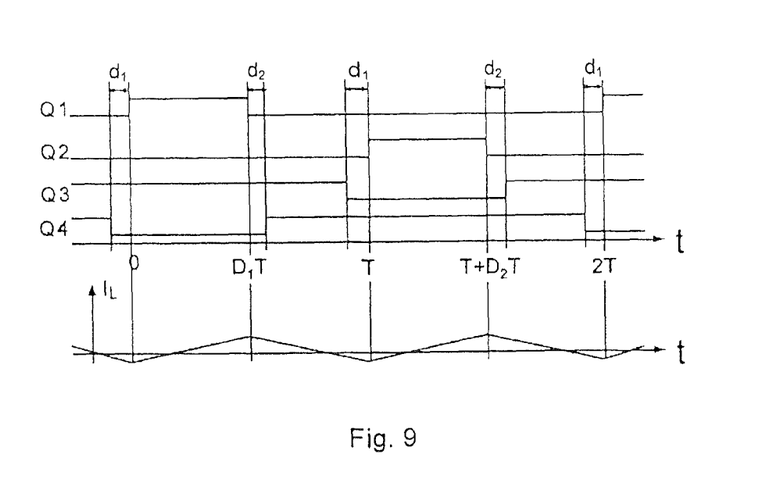
FIG. 9 shows a timing diagram in accordance with which the SMPS of FIG. 4 operates in continuous conduction mode to yield a current in the output choke which changes direction during operation.

As noted above, in FIG. 3 the DC current drawn by the load R at the output of the power supply is large enough for the current $I_L$ flowing through the inductor L to remain above zero throughout the switching cycle. However, if the load current is not large enough the direction of current flow through the inductor can reverse during the switching cycle, as illustrated in FIG. 9. Thus, in the continuous conduction mode, the direction in which the current $I_L$ can flow is not restricted. The difference between the dead times $d_1$ and $d_2$ in the two cases (i.e. always positive current $I_L$ in the first case, and reversing current $I_L$ in the second case) is affected by the current $I_L$ changing the time it takes to switch the switching elements ON or OFF. An extreme case occurs when the load current is close to zero, where the dead times become longer.

The aforementioned three current regions may further be divided into operation sub-regions or merged into larger operation regions, each having associated with it a respective value for $T_i$ and $T_{dec}$, for example. The input voltage $V_{in}$ affects the turn-ON and turn-OFF times of the switching devices Q1-Q4. Hence, the operation regions may also be divided with respect to the input voltage, for example into three or more different regions. The regions may overlap yielding hysteresis, which may need to be taken into consideration when configuring the switching delay controller 150.

The inventors have found that the assignment of a respective single value for the switching delay to each of the power supply's operation regions (or to some of the operation regions) can yield more efficient operation in those regions and reduce the need for unnecessary delay optimisation when the operation state of the SMPS changes within one of those operation regions. In other words, the processing overhead associated with the repeated running of the switching delay optimisation process can be reduced by running the optimisation process only when the operation state of the SMPS 300 changes from one operation region to another. Thus, the trigger unit 153 is preferably configured to detect a change in operation state of the SMPS 300 from a first operation region to a second operation region and, upon detecting said change, cause the feedback signal monitor 151 and switching delay calculator 152 to execute the switching delay optimisation process described above in order to ensure efficient running of the SMPS in the its new operation state.

To further avoid unnecessary execution of the delay optimisation algorithm, the trigger unit 153 is preferably arranged to keep a log of the operation state of the SMPS 300 and, upon detecting a change in the operation state from the first operation region to a second operation region in which the SMPS 300 has not previously operated, cause the switching delay calculator 152 to control the switching delay using the determined change in the feedback signal so as to increase the efficiency of the SMPS. On the other hand, if the trigger unit 153 detects a change in the operation state from the first operation region to a second operation region in which the SMPS 300 has previously operated, it is preferably configured to cause the switching delay calculator 152 to set the switching delay to a value used during the previous operation in the aforementioned second operation region.

Embodiment 2

In the continuous conduction mode, when the current drawn by the load is not large enough the current $I_L$ in the inductor L can reverse, as shown in FIG. 9. When this occurs, energy is transferred from the secondary side of the power supply 300 to its primary side, which reduces the power supply's efficiency. This effect can be voided by switching OFF transistors Q3 and Q4 when the current $I_L$ goes to zero; $I_L$ then cannot be negative and the reverse energy transfer is prevented. The switch timings required for the SMPS 300 to operate in this so-called discontinuous conduction mode are illustrated in FIG. 10.

Figure 10:
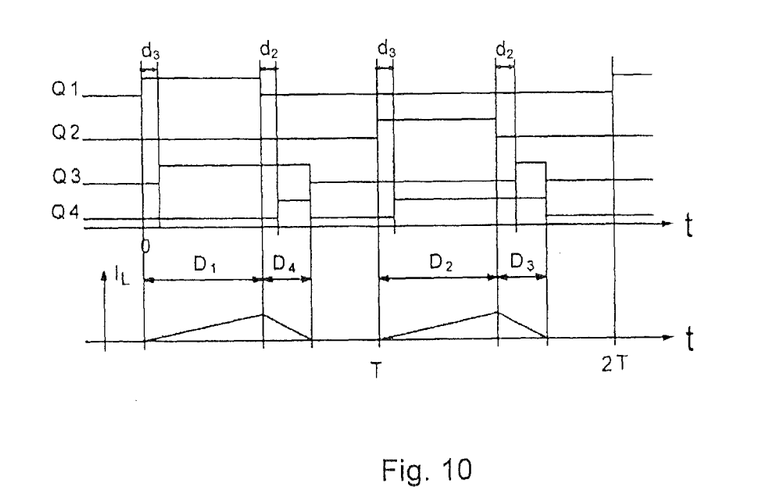
FIG. 10 shows a timing diagram in accordance with which the circuit of FIG. 2 operates in discontinuous conduction mode in a second embodiment of the present invention.

As shown in FIG. 10, a switching delay $d_2$ between the switching of Q1 and Q4, and between Q2 and Q3, is present, as in the timing diagram of FIG. 3. However, the switching delay $d_1$ is no longer required since both of the transistors on the secondary side (Q3 and Q4) are OFF when either of the primary transistors (Q1 or Q2) is turned ON. Furthermore, a new dead time, $d_3$, is present in the timing diagram of FIG. 10, which is required so that the current $I_L$ does not start to reverse before energy from the primary side reaches the secondary side of the transformer.

Thus, the SMPS 300 according to the second embodiment differs from that of the first embodiment described above by the PWM controller 130-2 controlling the switching of transistors Q1-Q4 in accordance with the timing diagram shown in FIG. 10, with switching delays $d_2$ and $d_3$ being controlled in accordance with the techniques described above, instead of delay times $d_1$ and $d_2$ as in the first embodiment. Other aspects of the SMPS of the second embodiment are the same as for the first embodiment and will therefore not be described again here.

Modifications and Variations

Many modifications and variations can be made to the embodiments described above.

For example, in the embodiments described above the feedback signal monitor 151, switching delay calculator 152 and trigger unit 153 are each provided using programmable processing apparatus 400 having a processor 420 which provides the respective functions of these components by executing software instructions stored in instructions store 440. However, it will be appreciated that each or all of the aforementioned components may be implemented in dedicated hardware, e.g. a field-programmable gate array (FPGA).

In the above embodiments, the delay times controlled by the PWM controller 130-2 are between the switching of transistors provided on opposite sides of the power supply's transformer (e.g. transistors Q1 and Q4 in the case of dead time $d_1$). However, the switching delay being controlled may alternatively be provided between the switching of transistors that are both provided on the primary side or the secondary side of the isolation transformer. For example, in a push-pull converter the PWM controller 130-2 may control the dead time for the transistors on the primary side of the converter such that substantially no cross-conduction occurs through these switching elements during operation, which would lead to a shorting of the converter's input.

Furthermore, although the above-described embodiments employ a half-bridge configuration on the primary side, other well-known topologies may alternatively be used. For example, a full-bridge configuration with four transistors may be more suitable for higher-power applications. Alternatively, a push-pull arrangement can be used. On the secondary side, a single winding may alternatively be used together with synchronous full-wave rectification. More generally, the switching delay control techniques described above can be used with any SMPS topology which satisfies the following conditions: i) Durability to withstand an insufficient dead time for a controlled period of time $T_c$; and ii) An insufficient dead time during the time $T_c$ will induce a temporary change (e.g. a dip) in the output of the SMPS that is within specification of the power supply yet large enough to be detected by the power supply's error amplifier.

In step S30 of the process shown in FIG. 7, the switching delay calculator 152 reduces the switching delay $T_{delay}$ by $T_{dec}$ for one switching cycle of the SMPS and then sets $T_{delay}$ back to its previous value in step S40, thereby minimising the risk of the SMPS 300 sustaining damage in case the temporarily decreased value of $T_{delay}$ leads to a short-circuit of the secondary winding 112 of the power supply's transformer. However, in alternative embodiments, step S40 could be omitted and the response of the feedback signal from the error amplifier 140 to a step decrease in the switching delay subsequently monitored instead. This may decrease noise on the power supply's output, although at greater risk of damage to the power supply's switching elements. In these variants, $T_{delay}$ would need to be incremented to a safe value (e.g. $T_{delay}+T_{dec}$) if a significant change in the feedback signal is detected in step S90.

In the above-described embodiments, the triggering of the delay optimization algorithm is related to the operation state of the SMPS 300. However, in other embodiments the execution of the optimization algorithm may be triggered on the basis of a configurable time period. For example, the switching delay optimisation may be triggered more frequently at times when the SMPS load is more likely to fluctuate (e.g. at certain times of day) than at other times (e.g. at night).

The invention claimed is:

1. A switching delay controller configured to control a switching delay between switching a first switching element and a second switching element in a switched mode power supply, the switched mode power supply comprising a feedback signal generator operable to generate a feedback signal indicative of a difference between an output of the switched mode power supply and a reference for the output, and a drive circuit operable to switch the first and second switching elements so as to convert an input voltage to the switched mode power supply into an output voltage thereof based on the feedback signal, the switching delay controller comprising:
    a switching delay calculator operable to cause a change of the switching delay for at least one switching cycle of the switched mode power supply; and
    a feedback signal monitor operable to monitor the feedback signal and determine a change in the feedback signal in response to the change of the switching delay by the switching delay calculator,
    wherein the switching delay calculator is further operable to calculate a calculated switching delay to increase an efficiency of the switched mode power supply based on the determined change in the feedback signal, and cause a change of the switching delay in the switched mode power supply to the calculated switching delay, and
    wherein the switching delay controller is configured such that, in operation, the switching delay calculator causes a first change of the switching delay from a first value to a second value for at least one switching cycle of the switched mode power supply and then a second change from the second value back to the first value, said first and second changes occurring before the feedback signal monitor begins monitoring the feedback signal or before the feedback signal monitor finishes monitoring the feedback signal.

2. A switching delay controller according to claim 1, wherein the switched mode power supply further comprises a transformer having a primary winding and a secondary winding, a primary side circuit comprising the first switching element arranged to drive the primary winding, and a secondary side circuit comprising the second switching element, the secondary winding being arranged to drive a current through the second switching element, and
wherein the switching delay calculator is arranged to calculate a switching delay such that the second switching element does not short-circuit the secondary winding while energy is being transferred from the primary side circuit to the secondary side circuit during operation of the switched mode power supply.

3. A switching delay controller according to claim 1, wherein the switched mode power supply further comprises a transformer having a primary winding and a secondary winding, a primary side circuit comprising the first switching element arranged to drive the primary winding, a secondary side circuit comprising the second switching element, and an output filter comprising an inductor connected to the secondary side circuit, the secondary winding being arranged to drive a current through the second switching element, and
wherein the switching delay calculator is arranged to calculate a switching delay such that a current in the inductor is prevented from reversing before energy is transferred from the primary side circuit to the secondary side circuit during operation of the switched mode power supply in discontinuous conduction mode.

4. A switching delay controller according to claim 1, wherein the switched mode power supply further comprises a transformer having a primary winding and a secondary winding, and a primary side circuit comprising the first and second switching elements arranged to drive the primary winding, and
wherein the switching delay calculator is arranged to calculate a switching delay such that substantially no cross-conduction through the first and second switching elements occurs during operation of the switched mode power supply.

5. A switching delay controller according to claim 1, further comprising a trigger unit operable to detect a change in at least one of the input voltage and an output current of the switched mode power supply, and based upon said change, cause the switching delay calculator and the feedback signal monitor to operate to perform said calculation and change of the switching delay so as to increase the efficiency of the switched mode power supply.

6. A switching delay controller according to claim 5, wherein the trigger unit is operable to detect a change in operation state of the switched mode power supply from a first operation region to a second operation region, each of the first and second operation regions being defined by respective ranges of values of both the input voltage and the output current of the switched mode power supply, the trigger unit being further operable, upon detecting said change, to cause the switching delay calculator and the feedback signal monitor to operate to perform said calculation and change of the switching delay so as to increase the efficiency of the switched mode power supply.

7. A switching delay controller according to claim 6, wherein the trigger unit is operable to keep a log of the operation state of the switched mode power supply and,
upon detecting a change in the operation state from the first operation region to a second operation region in which the switched mode power supply has not previously operated, cause the switching delay calculator and the feedback signal monitor to operate to perform said calculation and change of the switching delay so as to increase the efficiency of the switched mode power supply, otherwise
upon detecting a change in the operation state from the first operation region to a second operation region in which the switched mode power supply has previously operated, cause the switching delay calculator to set the switching delay to a value used during the previous operation in said second operation region.

8. A method of controlling a switching delay between switching a first switching element and a second switching element in a switched mode power supply, the switched mode power supply comprising a feedback signal generator operable to generate a feedback signal indicative of a difference between an output of the switched mode power supply and a reference for the output, and a drive circuit operable to switch the first and second switching elements so as to convert an input voltage to the switched mode power supply into an output voltage thereof based on the feedback signal, the method comprising:
causing a change of the switching delay for at least one switching cycle of the switched mode power supply;
monitoring the feedback signal and determining a change in the feedback signal in response to the change of the switching delay;
calculating a calculated switching delay to increase an efficiency of the switched mode power supply based on the determined change in the feedback signal; and
causing a change of the switching delay in the switched mode power supply to the calculated switching delay,
wherein the process of causing a change of the switching delay comprises causing a first change of the switching delay from a first value to a second value for at least one switching cycle of the switched mode power supply and then a second change from the second value back to the first value, said first and second changes occurring before the monitoring of the feedback signal is started or before the monitoring of the feedback signal is finished.

9. A method according to claim 8, wherein the switched mode power supply further comprises a transformer having a primary winding and a secondary winding, a primary side circuit comprising the first switching element arranged to drive the primary winding, and a secondary side circuit comprising the second switching element, the secondary winding being arranged to drive a current through the second switching element, and
wherein the switching delay is calculated such that the second switching element does not short-circuit the secondary winding while energy is being transferred from the primary side circuit to the secondary side circuit during operation of the switched mode power supply.

10. A method according to claim 8, wherein:
the switched mode power supply further comprises a transformer having a primary winding and a secondary winding, a primary side circuit comprising the first switching element arranged to drive the primary winding, a secondary side circuit comprising the second switching element, and an output filter comprising an inductor connected to the secondary side circuit, the secondary winding being arranged to drive a current through the second switching element;

the first and second switching elements are switched such that the switched mode power supply operates in discontinuous conduction mode; and the switching delay is calculated such that a current in the inductor is prevented from reversing before energy is transferred from the primary side circuit to the secondary side circuit.

11. A method according to claim 8, wherein the switched mode power supply further comprises a transformer having a primary winding and a secondary winding, and a primary side circuit comprising the first and second switching elements arranged to drive the primary winding, and wherein the switching delay is calculated such that substantially no cross-conduction through the first and second switching elements occurs during operation of the switched mode power supply.

12. A method according to claim 8, further comprising detecting a change in at least one of the input voltage and an output current of the switched mode power supply and, based on said change, causing the switching delay to be calculated and changed so as to increase the efficiency of the switched mode power supply.

13. A method according to claim 12, wherein the process of detecting the change at least one of the input voltage and the output current of the switched mode power supply comprises detecting a change in an operation state of the switched mode power supply from a first operation region to a second operation region, each of the first and second operation regions being defined by respective ranges of values of both the input voltage and the output current of the switched mode power supply.

14. A method according to claim 13, further comprising:
keeping a log of the operation state of the switched mode power supply; and
upon detecting a change in the operation state from the first operation region to a second operation region in which the switched mode power supply has not previously operated, causing the switching delay to be calculated and changed so as to increase the efficiency of the switched mode power supply, otherwise
upon detecting a change in the operation state from the first operation region to a second operation region in which the switched mode power supply has previously operated, causing the switching delay to be set to a value used during the previous operation in said second operation region.

15. A computer-readable storage medium storing computer program instructions which, when executed by a processor, cause the processor to perform a method as set out in claim 8.

16. A switching delay controller configured to control a switching delay between switching a first switching element and a second switching element in a switched mode power supply, the switched mode power supply comprising a feedback signal generator operable to generate a feedback signal indicative of a difference between an output of the switched mode power supply and a reference for the output, and a drive circuit operable to switch the first and second switching elements so as to convert an input voltage to the switched mode power supply into an output voltage thereof based on the feedback signal, the switching delay controller comprising:

a switching delay calculator operable to cause a change of the switching delay for at least one switching cycle of the switched mode power supply; and a feedback signal monitor operable to monitor the feedback signal and determine a change in the feedback signal in response to the change of the switching delay by the switching delay calculator, wherein the switching delay calculator is further operable to calculate a calculated switching delay to increase an efficiency of the switched mode power supply based on the determined change in the feedback signal, and cause a change of the switching delay in the switched mode power supply to the calculated switching delay; and a trigger unit operable to detect a change in at least one of the input voltage and an output current of the switched mode power supply, and based upon said change, cause the switching delay calculator and the feedback signal monitor to operate to perform said calculation and change of the switching delay so as to increase the efficiency of the switched mode power supply, wherein the trigger unit is operable to detect a change in operation state of the switched mode power supply from a first operation region to a second operation region, each of the first and second operation regions being defined by respective ranges of values of both the input voltage and the output current of the switched mode power supply, the trigger unit being further operable, upon detecting said change, to cause the switching delay calculator and the feedback signal monitor to operate to perform said calculation and change of the switching delay so as to increase the efficiency of the switched mode power supply, wherein the trigger unit is operable to keep a log of the operation state of the switched mode power supply and,
upon detecting a change in the operation state from the first operation region to a second operation region in which the switched mode power supply has not previously operated, cause the switching delay calculator and the feedback signal monitor to operate to perform said calculation and change of the switching delay so as to increase the efficiency of the switched mode power supply, otherwise
upon detecting a change in the operation state from the first operation region to a second operation region in which the switched mode power supply has previously operated, cause the switching delay calculator to set the switching delay to a value used during the previous operation in said second operation region.

17. A method of controlling a switching delay between switching a first switching element and a second switching element in a switched mode power supply, the switched mode power supply comprising a feedback signal generator operable to generate a feedback signal indicative of a difference between an output of the switched mode power supply and a reference for the output, and a drive circuit operable to switch the first and second switching elements so as to convert an input voltage to the switched mode power supply into an output voltage thereof based on the feedback signal, the method comprising:

causing a change of the switching delay for at least one switching cycle of the switched mode power supply;
monitoring the feedback signal and determining a change in the feedback signal in response to the change of the switching delay;
calculating a calculated switching delay to increase an efficiency of the switched mode power supply based on the determined change in the feedback signal; and
causing a change of the switching delay in the switched mode power supply to the calculated switching delay;
detecting a change in at least one of the input voltage and an output current of the switched mode power supply and, based on said change, causing the switching delay to be calculated and changed so as to increase the efficiency of the switched mode power supply, wherein the process of detecting the change at least one of the input voltage and the output current of the switched mode power supply comprises detecting a change in an operation state of the switched mode power supply from a first operation region to a second operation region, each of the first and second operation regions being defined by respective ranges of values of both the input voltage and the output current of the switched mode power supply;

keeping a log of the operation state of the switched mode power supply; and upon detecting a change in the operation state from the first operation region to a second operation region in which the switched mode power supply has not previously operated, causing the switching delay to be calculated and changed so as to increase the efficiency of the switched mode power supply, otherwise upon detecting a change in the operation state from the first operation region to a second operation region in which the switched mode power supply has previously operated, causing the switching delay to be set to a value used during the previous operation in said second operation region.

\* \* \* \* \*

UNITED STATES PATENT AND TRADEMARK OFFICE
CERTIFICATE OF CORRECTION

| | | |
|---|---|---|
| PATENT NO. | : 8,902,617 B2 | Page 1 of 1 |
| APPLICATION NO. | : 13/502276 | |
| DATED | : December 2, 2014 | |
| INVENTOR(S) | : Wahledow et al. | |

It is certified that error appears in the above-identified patent and that said Letters Patent is hereby corrected as shown below:

In the Specification

In Column 9, Lines 21-22, delete "step before being in S30" and insert -- in step S30 --, therefor.

Signed and Sealed this
Twenty-ninth Day of September, 2015

Michelle K. Lee
*Director of the United States Patent and Trademark Office*